Patented Oct. 14, 1930

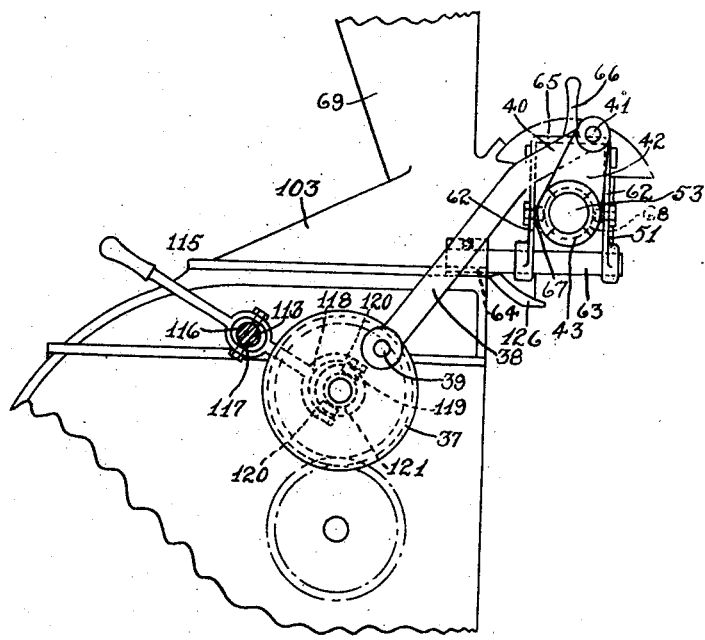
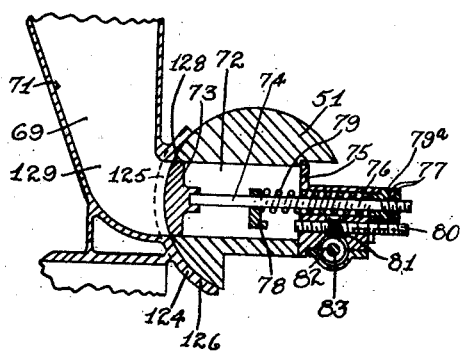

1,778,218

UNITED STATES PATENT OFFICE

WILLIAM G. KIRCHHOFF, OF CINCINNATI, OHIO, ASSIGNOR TO THE J. H. DAY COMPANY, OF CINCINNATI, OHIO, A CORPORATION OF OHIO

DOUGH DIVIDER

Application filed December 9, 1925. Serial No. 74,371.

This invention relates to improvements in dough dividers.

An object of my invention is to provide a plurality of dough dividers depositing lumps of divided dough upon the same belt.

Another object of my invention is to provide a device to accomplish the above object wherein either of the individual dividers may be operated at one time or wherein all of the dividers may be operated at the same time.

Another object of my invention is to provide a device that is simple and economical of construction and operation in order to attain the above objects.

These and other objects are attained by the means described herein and disclosed in the accompanying drawings, in which:

Fig. 3 is a cross sectional view taken on line 3—3 of Fig. 1.

Fig. 4 is a cross sectional view taken on line 4—4 of Fig. 1.

Figure 1:
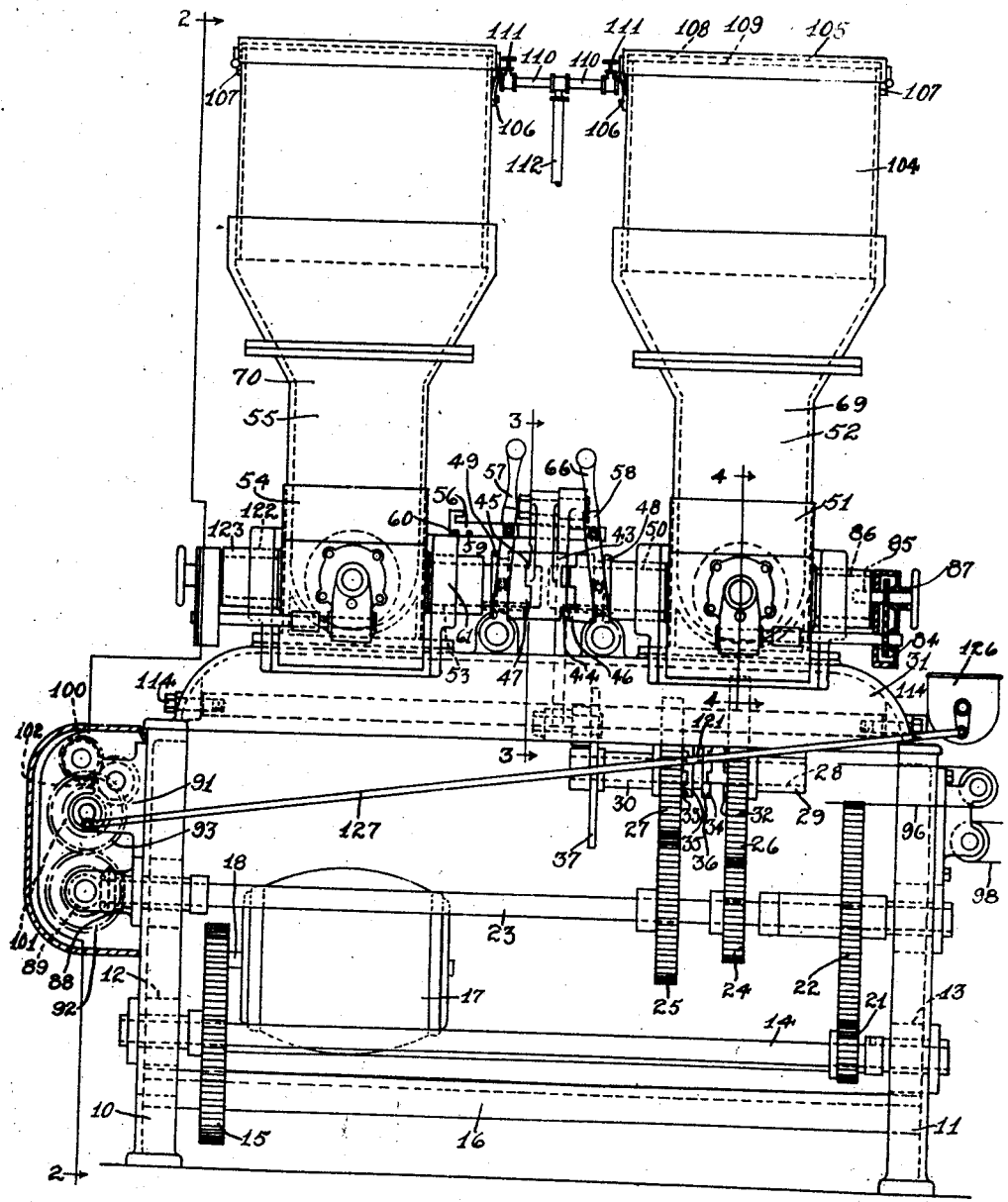
Fig. 1 is a front elevation of a device having embodied therein my invention.
Figure 2:
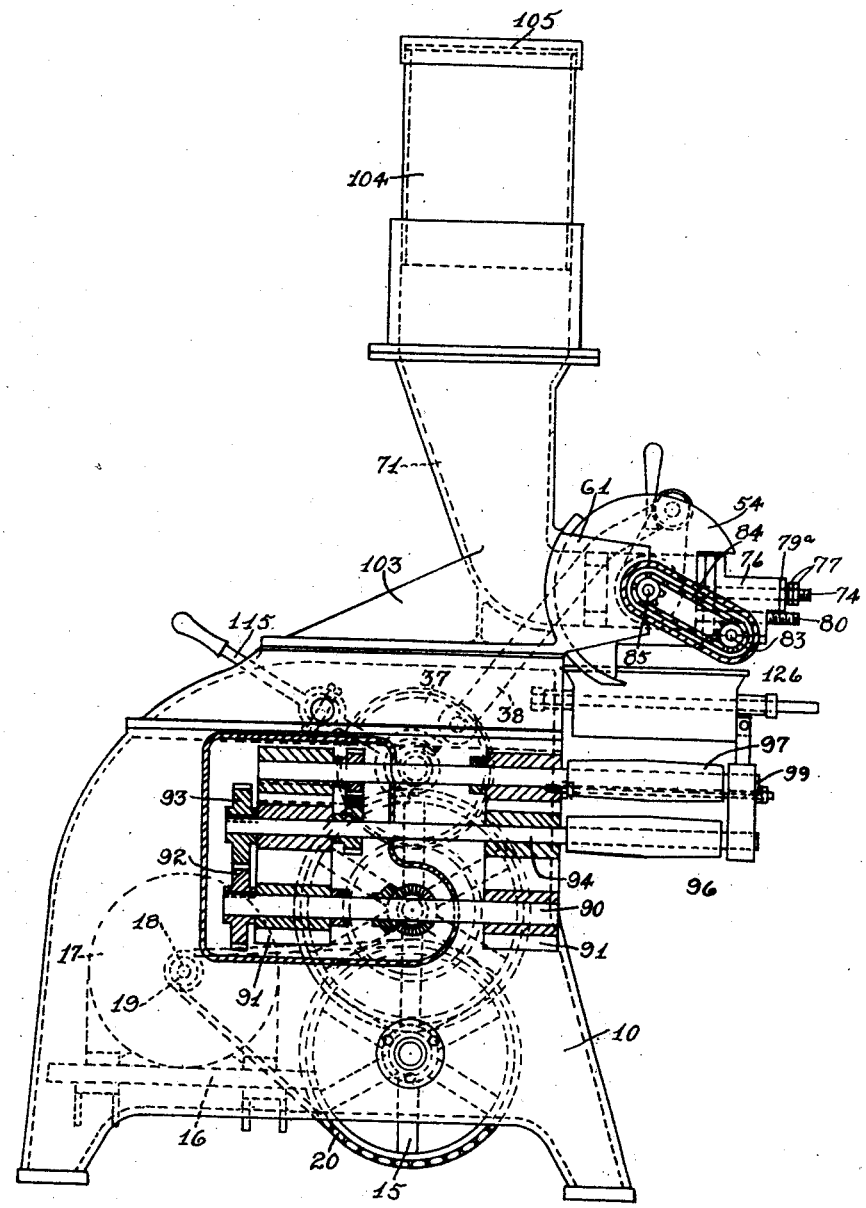
Fig. 2 is a view taken on line 2—2 of Fig. 1, showing part of the device in elevation and other parts in cross section.

The device of my invention comprises a frame 10 and 11 having suitable bearings 12 and 13 formed thereon. Suitably journaled in the bearings 12 and 13 is a drive shaft 14 having mounted thereon a drive gear or sprocket 15. The frame 10 and 11 carries a platform 16, upon which a motor 17 is mounted. Mounted on one end of the motor shaft 18 is a sprocket 19 for transmitting motion or power to the drive shaft 14 by means of a sprocket chain 20. The drive shaft 14 has mounted on it a gear or pinion 21, which meshes with a gear 22 mounted on a driven or counter shaft 23, for transmitting motion from the drive shaft to the driven shaft. The driven shaft 23 also has mounted on it gears 24 and 25 which mesh with gears 26 and 27 respectively. Gears 26 and 27 are loosely mounted on a stub shaft 28 which is carried by suitable bearings 29 and 30 secured to the upper frame 31 of the device.

The gears 26 and 27 have formed on their inner faces clutch teeth 32 and 33 which are adapted to engage clutch teeth 34 and 35 formed on each side of a clutch spool 36. Clutch spool 36 is splined to the stub shaft 28 so that clutch teeth 34 may engage clutch teeth 32 or clutch teeth 35 may engage clutch teeth 33, as desired. From the drawings it will be noted that gears 24, 25, 26, and 27 are of different sizes whereby a gear box, or change speed mechanism is produced for rotating the stub shaft 28, see Fig. 1. A lever 115 having formed therein an opening or perforation 116 through which extends a rod or shaft 113 is provided for actuating the clutch spool 36. The lever 115 is pivotally mounted on the rod 113 as shown at 117, see Fig. 3. The rod 113 is secured longitudinally of the frame 31 in any suitable manner, such as by means of bolts 114. The inner end 118 of lever 115 is bifurcated and has rollers 119 mounted on the arms 120 thereof. The rollers 120 enter into a groove 121 formed in the clutch spool 36 for shifting the spool into and out of engagement with the clutch teeth formed on the gears 26 and 27.

A disc 37 is secured to one end of the stub shaft 28. An arm 38 is pivotally and eccentrically mounted to the disc 37, as shown at 39. The other end 40 of the arm 38 is pivoted at 41 to a lever 42 carried by a collar 43. The collar 43 has formed on each side of its clutch teeth 44 and 45 which engage clutch teeth 46 and 47 respectively carried by clutch spools 48 and 49. Clutch spool 48 is splined to trunnion 50 carried by oscillating drum 51 of the dough divider 52. Clutch spool 49 is splined to a trunnion 53 carried by oscillating drum 54 of the dough divider 55.

It will be noted from Fig. 1 that each of the trunnions 50 and 53 extend into the clutch collar 43. It should also be noted that the rotation of disc 37 causes an oscillation of the arm 42 and clutch collar 43 through the eccentrically mounted arm 38. It will therefore be obvious that should either of the clutch spools 48 or 49 be engaged with the clutch collar 43, the drum upon which the clutch spool is keyed, will be oscillated. It is also obvious that should all of the clutch spools be engaged with the clutch collar, all of the drums would be oscillated.

Levers 57 and 58 are provided for actuating the clutch spools 48 and 49. These levers are identical, wherefore a description of one will be sufficient for the other. Lever 57 comprises arms 62 having bores formed in the ends thereof through which extends a suitable shaft 63 which is secured in a bearing 64, mounted on the upper housing 31. The shaft 63 forms a pivot for the lever. The upper ends of the arms 62 are joined by a cross-brace 65, from which extends the actuating lever 66. Rollers 67 are secured to the arms 62 intermediate the pivotal mounting 63 and the cross-brace 65 and extend into a groove 68 formed in the clutch spool 48 for shifting the clutch spool in and out of engagement with the clutch collar.

I have provided an arm 56 pivotally mounted on each of the levers 57 and 58 having notches 59 formed in one end thereof. The notches 59 engage a tongue or lug 60 formed on the projection 61 of the hopper frame 103 for locking the levers 57 and 58 in the desired position.

The hopper frame 103 has extending from each side suitable projections 61 having formed therein bores 122. Suitable bearings 123 are secured in the bores 122 in which the trunnions of the oscillating drums are journaled. A curved plate 124 conforming to the contour of the oscillating drum 51 is formed integral with the frame 103. The plate 124 is provided with an opening 125 which registers with an opening 72 formed in the drum 51. The lower portion 126 of the plate 124 forms a closure or seal for the opening 72 when the drum is being oscillated from the horizontal to the vertical position.

Mounted above the oscillating drums 51 and 54 are the dough hoppers 69 and 70 which are identical in construction, wherefore a description of one will suffice. The dough hoppers comprise an inclined chute 71 which leads to the opening or pocket 72 formed in the oscillating drum 51. The chute 71 is mounted upon and extends upwardly from the hopper frame 103. A dough supply hopper 104 is secured to the chute 71 in any suitable manner. The chute 71 and the hopper 104 may be formed integral or separable as desired. The hopper 104 may be made of a length to extend above the floor above the one upon which the divider is positioned or a platform may be built around the supply hopper 104 for replenishing the supply of dough. A suitable lid or cover 105 is provided for sealing the upper end of the hopper. Any suitable quickly detachable means or cover may be used. As shown herein, an ordinary cover is used having a suitable lock 106 at one side and a hinge 107 at the opposite side. The hopper must be made air-tight and a gasket 108 has been provided intermediate the upper edge 109 of the hopper 104 and the body of the lid 105 for hermetically sealing the hopper. The dough is delivered under pressure to the opening 72 from the chute 71. In order to obtain this pressure, compressed air is admitted to the hopper 104 at the top thereof through suitable pipes 110. A suitable valve 111 is provided in each of the pipes 110 so that the dough in either hopper may be under pressure or not, as required. A suitable connecting pipe 112 connects the pipes 110 with the air pump or supply tank, not shown.

Mounted interiorly of the opening 72 is a piston 73 having secured thereto a piston rod 74. At the rear of the opening and covering same a plate 75 having a sleeve-like extension 76, is secured. The piston rod 74 extends through the plate 75 and sleeve 76 and carries at its rear end lock nuts 77. Adjustably secured to the piston rod 74 is a stop 78 against which one end of a coil spring 79 abuts. The other end of the coil spring 79 abuts a threaded nut $79^a$ secured in the rear end of the sleeve 76. The sleeve 76 has reciprocally mounted in it a screw 80 splined to sleeve 75. Screw 80 extends into the opening 72 and against which the stop 78 strikes. A worm wheel 81, internally threaded, is mounted upon the screw 80. A worm 82 is carried by shaft 83 which extends at right angles to the worm wheel 81. The shaft 83 has mounted on it a sprocket, about which sprocket chain 84 passes. A stud shaft 85, journaled in one end of a trunnion 86 carried by the oscillating drum, also has a sprocket secured to it about which the sprocket chain 84 extends. A hand wheel 87 is mounted on the end of the stud shaft 85 for actuating said stud shaft. It should be noted that the movement of the piston 73 is governed or limited by the stop 78 contacting the screw 80. When the hand wheel 87 is actuated, shaft 83 is also actuated whereby worm 82 actuating worm wheel 81 causes screw 80 to enter the opening 72 whereby adjustably limiting the distance between the stop 78 and the screw 80.

Mounted on one end of shaft 23 is a bevel gear 88 which meshes with a complementary bevel gear 89 carried by shaft 90. Shaft 90 is suitably journaled in bearing blocks 91, carried by the frame 10. Mounted on one end of the shaft 90 is a gear 92 which meshes with a gear 93 carried by a second shaft 94. Shaft 94 has mounted on it a belt-drum 95 about which extends belt 96. A second belt-drum 97 about which extends belt 98 is carried by shaft 99 which is driven from shaft 94 through spur gears 100, 101 and idler gear 102. The shafts 90, 94 and 99 are all journaled in the bearing blocks 91.

It should be noted that belt 96 extends longitudinally of the device and each of the dividers 52 and 55 discharge onto the belt 96. It should further be noted that belts 96 and 98 travel in the same direction and belt 96 discharges onto belt 98. A flouring device 126 is mounted on the frame 10 in a suitable position for dusting both belts 96 and 98. A link 127, eccentrically mounted on shaft 94, is provided to actuate the flouring device.

The operation of my device is as follows:

The dough is placed in the hopper 104 of the divider 52 and the lid or cover 105 thereof securely locked so that the hopper is airtight. Valve 111 is opened to permit the compressed air to exert its pressure on the mess of dough and force same down the inclined chute 71 toward the opening 72 in the drum 51. Clutch spool 36 is then actuated so that the teeth thereof may be engaged with either of the clutches formed on the gears 26 and 27, according to the speed desired. The clutch spool 48 is now actuated to engage clutch collar 43 whereupon the drum 51 is oscillated. The dough, by this time, has been forced into the opening 72 and the piston 73 pushed forward until the stop 78 on piston rod 74 contacts the reciprocating screw 80, thereby compressing the coil spring 79. The coil spring 79 exerts a yielding pressure and tends to discharge the opening 72. The lower portion 126 of the plate 124 seals the opening 72 and prevents a discharge of the opening 72 until the opening has been oscillated to a vertical position, whereupon the spring pushes the piston 73 rearward through the opening 72 until the lock nuts 77 strike the threaded nut 79$^a$ carried by the sleeve 76. The upper edge 128 of the drum 51 acts as a knife for severing the dough, which has been forced into the opening 72, from the mass of dough contained in the chamber 129 formed at the base of the inclined chute 71. The action of the dough divided 51 continues until the hopper thereof is practically exhausted of dough. In the meantime the hopper of the divider 55 has been replenished with dough and the compressed air admitted to the top thereof. Just before the divider 52 is exhausted, the clutch lever 57 is actuated to engage clutch spool 49 with the clutch collar 43 for oscillating the drum 54. Both dividers 52 and 55 are now discharging upon the belt 96. It has been found that the first lumps of dough discharged from the newly charged divider are under weight and these are manually withdrawn from the belt and the divider allowed to continue to operate until the dough portions have reached the proper weight. When the lumps of dough from divider 55 have reached the proper weight, the divider 52 is disconnected from the clutch collar 43 and the hopper thereof recharged with dough. Operation of divider 55 is the same as the operation of divider 52, wherefore a description thereof is unnecessary. A suitable gage may be provided on the hoppers to inform the operator when the rough in the hoppers is depleted.

As has been previously explained the size of the lump of dough may be modified by adjusting the reciprocating screw 80. This adjustment may be made while the divider is in operation, thereby losing no time in adjusting or modifying the weight of the lumps of dough. Although I have described and disclosed my device as employing two dividers, it is readily evident that any number may be constructed in accordance with the disclosures herein for accomplishing an increase in production.

What I claim is:

1. In a multiple dough divider the combination of a frame, a drive shaft carried by the frame, a stub shaft mounted on the frame, means for transmitting motion from the drive shaft to the stub shaft, a disc mounted on the stub shaft, a plurality of hoppers mounted on the frame adapted to contain a substance under pressure, a drum mounted at the base of each hopper having an opening formed therein, a trunnion formed on adjacent ends of the drums, a clutch collar having an arm extending therefrom and receiving within the bore the ends of adjacent trunnions, a link eccentrically mounted on the disc carried by the stub shaft and on the arm extending from the collar, whereby the rotation of the disc will cause an oscillation of the clutch collar, an endless conveyor, a slidable clutch member splined on adjacent trunnions, and means for actuating the slidable clutch members whereby to selectively engage the slidable clutch members with the clutch collar for selective joint and several oscillation of the drums for alternately registering the opening in each drum with its respective hopper and discharging same onto the endless conveyor.

2. In a multiple dough divider of the class described the combination of an endless conveyor, two dividers each discharging onto the conveyor and each comprising a frame, a hopper associated with each frame, an oscillating drum having an opening formed therein carried by each frame, a trunnion formed at adjacent sides of the drums, a clutch collar receiving within the bore the adjacent trunnions, an inclined chute for directing a substance from the hoppers to the drums, a slidable clutch member splined on each trunnion of each drum, a lever associated with each slidable clutch whereby selective joint and several actuation of the slidable clutches may be obtained for engagement with the clutch collar, and means for oscillating the clutch collar whereby the drums may be jointly and severally oscillated for alternately registering the opening in the drum with the chute and discharging same onto the conveyor.

3. In a multiple dough divider of the class described the combination with a belt, of a plurality of dividers each discharging onto the belt and each comprising a hopper, an oscillating drum mounted at the base of each hopper and having an opening formed therein, a trunnion formed on the adjacent ends of the drums, an oscillating clutch collar having journaled therein the trunnions, a slidable clutch member splined on each trunnion, levers pivotally mounted for actuating the slidable clutch members whereby joint and several oscillation of the drums may be obtained.

4. In a device of the class described the combination of an endless conveyor, a plurality of oscillating drums each having an opening for discharging onto the conveyor, a hopper for each drum adapted to receive and deliver to the openings of their respective drums a substance under pressure, means within the openings for discharging substance from said openings, and means for selective joint and several oscillation of the drums.

5. In a device of the class described the combination with an endless conveyor, of a plurality of oscillating drums having an opening formed in each drum and discharging onto the conveyor, a hopper for each drum containing a substance under pressure and adapted to register with the opening in their respective drums, and means for selective oscillation of the drums.

6. In a dough divider the combination of a hopper adapted to contain a substance under pressure, an oscillating drum mounted at the base of the hopper having a bore extending therethrough, a trunnion formed at one end of the drum, a piston within the bore, a piston rod carried by the piston and extending centrally through the bore, a plate having a sleeve-like extension mounted on the drum for closing one end of the opening, a spring mounted on the piston rod yieldingly resisting the substance under pressure, a stop mounted on the piston rod for limiting the forward movement of the piston, a screw reciprocable through the sleeve like extension and extending into the pocket against which the stop strikes, a worm wheel mounted on the screw, a shaft extending at right angles to the reciprocating screw, a worm mounted on the shaft for actuating the worm wheel and reciprocating the screw, and means for actuating the worm shaft, said means comprising a stud shaft journaled in the trunnion and having a sprocket mounted thereon, a second sprocket mounted on the worm shaft, a chain extending about the sprockets, and a hand wheel mounted on the stud shaft for actuating the sprockets whereby the worm shaft, worm, worm wheel and reciprocating screw are actuated.

7. A divider comprising a hopper adapted to contain a substance under pressure, an oscillating drum mounted at the base of the hopper having an opening formed therein, the opening in the drum alternately registering with the hopper and the atmosphere, a piston within the opening, a piston rod carried by the piston, a spring mounted on the rod yieldingly resisting the substance under pressure and tending to discharge the substance from the opening, and a plate carried by the hopper forming a seal for the opening while the drum is being oscillated and preventing the discharge of the opening until the opening is in a substantially vertical position.

8. A dough divider comprising a hopper for containing a dough under pressure, an oscillating drum having an opening therein mounted at the base of the hopper, the opening in the drum alternately registering with the hopper and the atmosphere, a piston within the opening adapted to be moved by the dough, a piston rod extending forwardly therefrom, means within the opening for adjustably limiting the movement of the piston and a spring mounted on the piston rod yieldingly resisting movement of the piston and discharging the opening after the opening has been oscillated to a discharge position.

9. In a divider the combination of a hopper containing a substance under pressure, an oscillating drum mounted at the base of the hopper having an opening formed therein, the opening alternately registering with the hopper and the atmosphere, a piston within the opening adapted to be moved by the substance having a piston rod extending forwardly therefrom, yielding means within the opening yieldingly resisting movement of the piston, and tending to discharge substance from the opening, and means for adjustably limiting the movement of the piston, said means comprising a stop carried by the piston rod, a reciprocating screw extending into the opening contacting the stop, a worm wheel mounted on the reciprocating screw, a worm, and means for actuating the worm and worm wheel for reciprocating the screw thereby adjustably limiting the movement of the piston.

10. In a dough divider the combination of a hopper containing a dough under pressure, an oscillating drum having an opening formed therein, a piston reciprocally mounted in the opening adapted to be moved by the dough while in a horizontal position, a piston rod carried by the piston and extending forwardly therefrom, an adjustable spring mounted on the piston rod yieldingly resisting movement of the piston and urging the piston forward to discharge the dough from the opening, and means on the hopper to prevent the discharge of the opening until the opening has been actuated to a discharge position.

11. A dough divider comprising a hopper containing a dough under pressure, an oscillating drum having an opening therein mounted at the base of the hopper, the opening in the drum alternately registering with the hopper and atmosphere, a piston within the opening adapted to be moved by the dough, means within the opening adjustably limiting the movement of the piston, and adjustable means yieldingly resisting movement of the piston and discharging the dough from the opening after the opening has been actuated to a discharge position.

12. The combination of a pair of adjustable synchronously operable dough dividers, means submitting to each divider separate masses of dough under pressure, a common actuating means for the dividers, and means for selective and joint operation of the dividers by the common actuating means.

13. The combination of a pair of dividers for operation on plastics, means submitting to each divider separate masses of plastic under pressure, a common means for receiving discharges of plastic from both dividers, means for effecting synchronous movement of said dividers and said receiving means, and means for selective and joint operation of the dividers.

14. The combination of a pair of rockable dividers for operation on plastics, means submitting to each divider separate masses of plastic under pressure, a common actuating means for the dividers, means for selective and joint operation of the dividers by the common actuating means, and a common means operable synchronously with the dividers for receiving discharges of plastic from both dividers.

15. A synchronized dough working mechanism comprising a conveyor, a pair of adjustable dough dividers, power means for moving the conveyor and means for providing joint and several operation of the dividers from said power means in synchronism with the conveyor.

16. In a device for providing an unlimited timed series of dough lumps of uniform size the combination of a plurality of dough hoppers, means to controllably subject dough in said hoppers to uniform pressure, divider mechanism cooperating with each hopper, conveyor means adapted to receive the discharge from the divider mechanisms, power means to synchronously actuate the conveyor means and divider mechanisms, and means to effect selective and joint connection of the divider mechanisms with the power means.

In testimony whereof, I have hereunto subscribed my name this 1st day of December, 1925.

WILLIAM G. KIRCHHOFF.